United States Patent Office 3,162,676
Patented Dec. 22, 1964

3,162,676
ETHYLENICALLY UNSATURATED DERIVATIVES OF 2,4-DIHYDROXYBENZOPHENONE
Albert I. Goldberg, Berkeley Heights, N.J., and Martin Skoultchi and Joseph Fertig, New York, N.Y., assignors to National Starch and Chemical Corporation, New York, N.Y., a corporation of Delaware
No Drawing. Filed June 18, 1962, Ser. No. 202,983
6 Claims. (Cl. 260—486)

This invention relates to the preparation of ethylenically unsaturated derivatives of 2,4-dihydroxybenzophenone as well as to the novel derivatives thus prepared.

British Patent No. 885,986, relates to the preparation of the ethylenically unsaturated acryloxy and methacryloxy derivatives of 2,4-dihydroxybenzophenone by means of the reaction of the latter with either acrylyl of methacrylyl chloride. However, there are a number of factors which would appear to preclude any widespread commercial utilization of this particular synthetic route. Thus, for example, the acrylyl and methacrylyl chlorides are troublesome to prepare and are, accordingly, rather expensive and difficult to obtain. Moreover, the handling of these reagents presents many problems as they display a pronounced tendency towards spontaneous polymerization. The actual reaction between these acrylyl or methacrylyl chlorides and the 2,4-dihydroxybenzophenone is itself somewhat tedious inasmuch as it results in the evolution of hydrochloric acid which must be removed from the system by the initial presence, therein, of a tertiary amine such as pyridine. The resulting tertiary amine-hydrochloride acid adduct must then, in turn, be separated from the desired ethylenically unsaturated 2,4-dihydroxybenzophenone reaction product by employing a time consuming combination of extraction and distillation procedures.

It is thus the fundamental object of this invention to provide a novel class of ethylenically unsaturated derivatives of 2,4-dihydroxybenzophenone, said derivatives being capable of undergoing vinyl type polymerization reactions either alone or in the presence of other vinyl type co-monomers. A further object of this invention involves the preparation of polymerizable derivatives of 2,4-dihydroxybenzophenone which can be incorporated into a wide variety of polymers and copolymers so as to provide such polymers with improved heat stability and, more particularly, with improved light stability.

The novel compositions of our invention are the ethylenically unsaturated derivatives of 2,4-dihydroxybenzophenone having formulae corresponding to the following:

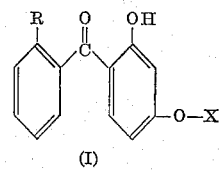
(I)

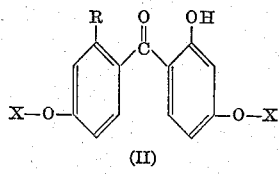
(II)

wherein X is a radical selected from among the group consisting of beta-hydroxypropyl acrylate, i.e.

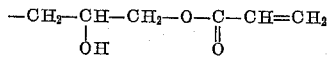

and beta-hydroxypropyl methacrylate, i.e.

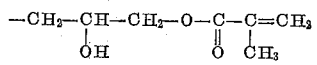

radicals and, wherein R represents a radical selected from among the class consisting of hydrogen and hydroxy radicals.

As representative of the 2,4-dihydroxybenzophenone derivatives of our invention, one may list the 4-acryloxy beta-hydroxypropyl ether of 2,4-dihydroxybenzophenone; the 4-methacryloxy beta-hydroxypropyl ether of 2,4-dihydroxybenzophenone; the 4-acryloxy beta-hydroxypropyl ether of 2,2',4-trihydroxybenzophenone; the 4-methacryloxy beta-hydroxypropyl ether of 2,2',4-trihydroxybenzophenone; the 4,4'-di(acryloxy beta-hydroxypropyl) ether of 2,2',4,4'-tetrahydroxybenzophenone; and, the 4,4'-di(methacryloxy beta-hydroxypropyl)ether of 2,2',4,4'-tetrahydroxybenzophenone. Thus, it is to be seen that the derivatives of our invention may be described as mono- and difunctional ethylenically unsaturated derivatives of 2,4-dihydroxybenzophenone; or, more specifically, as the mono- and di-beta-hydroxypropyl acrylate and methacrylate ethers of 2,4-dihydroxybenzophenone wherein said beta-hydroxypropyl acrylate or methacrylate groups are placed upon the 4 or on the 4 and 4' positions of the benzophenone nucleus.

All of the above listed compounds, as well as any others which may correspond to the above definition, are materials which are capable of readily undergoing vinyl type polymerization reactions. They are thus useful for the preparation of homopolymers and, more particularly, for the preparation of copolymers with a wide variety of other vinyl type monomers.

These copolymers are especially outstanding in regard to their superior light stability. This improved stability is imparted to these copolymers as a result of the presence therein of the 2,4-dihydroxybenzophenone moiety which is permanently bound into and inherently part of the resulting copolymer molecule as a result of the incorporation therein of the ethylenically unsaturated 2,4-dihydroxybenzophenone derivatives of our invention.

In brief, the synthesis of our novel derivatives is accomplished by the catalyzed reaction of a 2,4-dihydroxybenzophenone intermediate together with either glycidyl acrylate or glycidyl methacrylate.

The 2,4-dihydroxybenzophenone intermediates which are applicable for use in the process of our invention are compounds corresponding to the following formula:

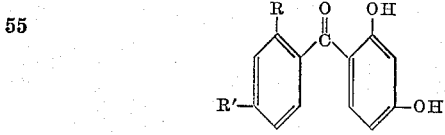

wherein R represents a radical selected from among the class consisting of hydrogen and hydroxy radicals and wherein R' represents a radical selected from among the class consisting of hydrogen and hydroxy radicals. It is to be noted at this point, that when R' in this formula is a hydroxy radical, the resulting derivative will be difunctional and correspond in our definition to compounds based on II, which represents those derivatives of our invention which are difunctional in character. These difunctional derivatives thereby contain, as is seen, two ethylenically unsaturated beta-hydroxypropyl acrylate or methacrylate side chains which are substituted on the 4 and 4' positions of the benzophenone nucleus. The subsequent use of these difunctional derivatives as comonomers in polymerization reactions may, if desired, result in the preparation of crosslinked copolymers, i.e. copolymers containing an interlaced, two dimensional structural network as opposed to uncrosslinked copolymers which are essentially linear and one dimensional in their configuration. Such crosslinked copolymers will, however, be produced only in those cases wherein the resulting copolymers have a high molecular weight. Thus, where desired, the practitioner may utilize these difunctional benzophenone derivatives of our invention as comonomers and nonetheless prepare non-crosslinked copolymers merely by conducting the polymerization under conditions which lead to low molecular weight polymers.

As examples of the 2,4-dihydroxybenzophenone intermediates which may be utilized in our process, one may list: 2,4-dihydroxybenzophenone, i.e.

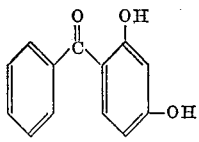

2,2',4,4'-tetrahydroxybenzophenone, i.e.

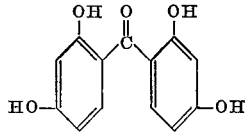

and, 2,2',4-trihydroxybenzophenone, i.e.

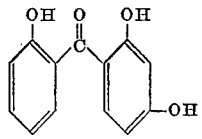

Hereinafter, it is to be understood that the use of the expression, "the 2,4-dihydroxybenzophenone intermediate" is for purposes of brevity and is meant to include any of the above listed intermediates, as well as any others which may correspond to the above noted formula which was given to represent these intermediates.

In conducting the reaction which leads to the synthesis of our novel derivatives, the glycidyl acrylate or glycidyl methacrylate, in a concentration amounting to a slight stoichiometric excess in the order of about 10 to 20% over the subsequently added 2,4-dihydroxybenzophenone intermediate, is first ordinarily admixed with the selected catalyst. The latter may be chosen from among any member of the group consisting of the alkali metal hydroxides, such as sodium hydroxide or potassium hydroxide, and the salts of the alkali metals, such as sodium bicarbonate or sodium chloride and the quaternary ammonium halides, such as tetramethylammonium chloride and tetrbutylammonium iodide.

These catalysts should be present in concentrations of about 0.1 to 5.0%, as based upon the weight of the glycidyl acrylate or methacrylate.

Mention may be made at this point of the fact that in those cases wherein the 2,4-dihydroxybenzophenone intermediate being utilized is one having a hydroxy radical substituted on the 4' position of the benzophene nucleus, e.g. 2,2',4,4'-tetrahydroxybenzophenone, it becomes necessary to use a concentration of the glycidyl acrylate or methacrylate amounting to slightly more than double the stoichiometric equivalent of the thus substituted 2,4-dihydroxybenzophenone intermediate. This increased concentration of the glycidyl acrylate or methacrylate is required inasmuch as the use of these particular intermediates leads, as noted earlier, to the preparation of difunctional derivatives which, as may be readily seen, require twice as much of the glycidyl acrylate or methacrylate to be employed in their synthesis.

Following the initial preparation of the mixture comprising the catalyst and the glycidyl acrylate or methacrylate, there is then added, with continued agitation, the selected 2,4-dihydroxybenzophenone intermediate. However, it should be emphasized that the use of this particular sequence is not critical to the process of our invention and may be altered by the practitioner to suit his particular needs. It is, in fact, possible to admix the reactants and the catalyst in any desired sequence. In any event, following the complete admixture of the 2,4-dihydroxybenzophenone intermediate with the catalyst and the glycidyl acrylate or methacrylate, agitation is continued while the resulting reaction mixture is maintained at a temperature in the range of about 50 to 100° C., and preferably at about 80 to 90° C., for periods of about 6 to 8 hours. Under these conditions, the reaction between the 2,4-dihydroxybenzophenone and the glycidyl acrylate or methacrylate will ordinarily proceed at a conversion in the range of about 80 to 95%.

In general, it should be noted that the preparation of the derivatives of our invention may be conducted at any temperature which will be high enough so as to result in an adequate reaction rate, but which will not be so high as to cause the spontaneous polymerization of the resulting ethylenically unsaturated 2,4-dihydroxybenzophenone derivative. In addition, the length of the reaction period will depend, for the most part, upon the specific 2,4-dihydroxybenzophenone intermediate which is being utilized. Thus, it is a matter of ordinary preparative experience on the part of the practitioner to determine the precise combination of time and temperature which will be best suited for the synthesis of any of the novel benzophenone derivatives coming within the scope of our invention.

Upon the completion of the reaction and with subsequent cooling of the reaction vessel to room temperature, the resulting products will ordinarily be in the form of viscous oils. For most purposes, including any subsequent polymerization reactions, this crude beta-hydroxypropyl acrylate or methacrylate ether of 2,4-dihydroxybenzophenone can then be used without any further purification being necessary. However, where desired, the relatively small amount of unreacted 2,4-dihydroxybenzophenone intermediate may be removed. Thus, such means as chromatographic separation techniques, as for example with the use of a silica gel column, have been found to yield a product which, by means of a saponification equivalent analysis, will indicate a purity of 100%, by weight. Other separation techniques, such as alkaline or organic solvent extraction procedures, may also be used where so desired by the practitioner.

It is also possible, if so desired, to prepare the novel derivatives of our invention by reaction in an organic solvent medium. Under these conditions, the 2,4-dihydroxybenzophenone intermediate, the catalyst, and the glycidyl acrylate or methacrylate may all be dissolved in a non-reactive polar solvent such as acetone, methyl ethyl ketone, or butyl acetate. The resulting derivative would then be recovered by distilling off the solvent whereupon the crude product could, again, be purified by means of the above noted techniques.

The following examples will further illustrate the embodiment of this invention. In these examples, all parts given are by weight unless otherwise noted.

Example I

This example illustrates the preparation of the 4-acryloxy beta-hydroxypropyl ether of 2,4-dihydroxybenzophenone, i.e.

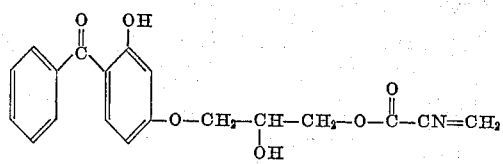

by means of the process of our invention.

An agitated mixture of 141.0 parts of glycidyl acrylate, 214.0 parts of 2,4-dihydroxybenzophenone and 2.8 parts of tetramethylammonium chloride was heated to a temperature in the range of 80–90° C. and maintained at this temperature for a period of 5 hours. Upon being cooled to 20° C., the resulting reaction product, which was in the form of a viscous oil, was removed and subjected to a base titration. The latter analysis revealed that there was about 2.5% of unreacted 2,4-dihydroxybenzophenone present within this reaction product which thereby indicated a conversion of 94% or a yield of about 321 parts of the 4-acryloxy beta-hydroxypropyl ether of 2,4-dihydroxybenzophenone.

Example II

This example illustrates the preparation of the 4-methacryloxy beta-hydroxypropyl ether of 2,4-dihydroxybenzophenone, i.e.

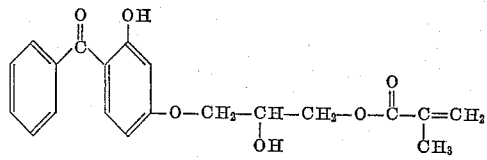

by means of the process of our invention.

An agitated mixture of 156.0 parts of glycidyl methacrylate, 214.0 parts of 2,4-dihydroxybenzophenone and 3.1 parts of sodium hydroxide was heated to a temperature in the range of 80–90° C. and maintained at this temperature for a period of 5 hours. Upon being cooled to 20° C., the resulting reaction product, which was in the form of a viscous oil, was removed and subjected to a base titration. The latter analysis revealed that there was about 5% of unreacted 2,4-dihydroxybenzophenone present within this reaction product which thereby indicated conversion of 85% or a yield of about 303 parts of the 4-methacryloxy beta-hydroxypropyl ether of 2,4-dihydroxybenzophenone.

Example III

The following table presents the pertinent data relating to the preparation of 4 additional ethylenically unsaturated benzophenone derivatives. In this table, derivatives #1 and 2 were prepared using 2,2', 4, 4'-tetrahydroxybenzophenone as the 2,4-dihydroxybenzophenone intermediate while derivatives #3 and 4 were prepared using 2,2',4-trihydroxybenzophenone as the 2,4-dihydroxybenzophenone intermediate. Moreover, derivatives #1 and 3 are beta-hydroxypropyl acrylate ethers of their respective 2,4-dihydroxybenzophenone intermediates which were prepared by means of the procedure of Example I whereas derivatives #2 and 4 are beta-hydroxypropyl methacrylate ethers of their respective 2,4-dihydroxybenzophenone intermediates which were prepared by means of the procedure of Example II. In the structural formulas which are given for each of these derivatives, the abbreviations "HPA" and "HPMA" are used, respectively, to designate the beta-hydroxypropyl acrylate and the beta-hydroxypropyl methacrylate groups.

| No. | Name | Parts Benzophenone Intermediate | Parts Glycidyl Acrylate | Parts Glycidyl Methacrylate | Percent Conversion | Yield (parts by wt.) |
|---|---|---|---|---|---|---|
| 1 | The 4,4'-di(acryloxy beta-hydroxypropyl) ether of 2,2',4,4,'-tetrahydroxybenzophenone. | 246 | 282 | | 92 | 470 |
| 2 | The 4,4'-di(methacryloxy beta-hydroxypropyl) ether of 2,2',4,4'-tetrahydroxybenzophenone. | 246 | | 312 | 82 | 434 |
| 3 | The 4-acryloxy beta-hydroxypropyl ether of 2,2',4-trihydroxybenzophenone. | 230 | 141 | | 93 | 332 |
| 4 | The 4-methacryloxy beta-hydroxypropyl ether of 2,2',4-trihydroxybenzophenone. | 230 | | 156 | 88 | 327 |

| No. | Structural Formula |
|---|---|
| 1 | HPA—O—[structure]—O—HPA |
| 2 | HPMA—O—[structure]—O—HPMA |
| 3 | [structure]—O—HPA |
| 4 | [structure]—O—HPMA |

Summarizing, our invention is thus seen to provide the practitioner with a novel class of ethylenically unsaturated derivatives of benzophenone. Variations may be made in proportions, procedures and materials without departing from the scope of this invention as defined in the following claims.

In the foregoing specification, and in the claims appended hereto, all of these derivatives have been called and are called, for purposes of brevity, ethylenically unsaturated derivatives of 2,4-dihydroxybenzophenone, since they can, in fact, all be considered derivatives of this particular hydroxybenzophenone compound.

What is claimed is:

1. An ethylenically unsaturated derivative of 2,4-dihydroxybenzophenone selected from the group consisting of

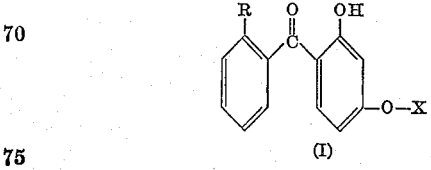

(I)

and

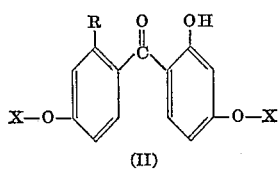

(II)

wherein X is an ethylenically unsaturated radical selected from the group consisting of acryloxy beta-hydroxypropyl acrylate and methacryloxy beta-hydroxypropyl methacrylate radicals and wherein R represents a radical selected from the class consisting of hydrogen and hydroxy radicals.

2. 4-acryloxy beta-hydroxypropyl ether of 2,4-dihydroxybenzophenone.

3. 4-methacryloxy beta-hydroxypropyl ether of 2,4-dihydroxybenzophenone.

4. 4-acryloxy beta-hydroxypropyl ether of 2,2',4-trihydroxybenzophenone.

5. 4-methacryloxy beta-hydroxypropyl ether of 2,2',4-trihydroxybenzophenone.

6. 4,4'-di(methacryloxy beta-hydroxypropyl) ether of 2,2',4,4'-tetrahydroxybenzophenone.

References Cited in the file of this patent
UNITED STATES PATENTS

| | | |
|---|---|---|
| 2,500,011 | Sexton | Mar. 7, 1950 |
| 2,734,087 | Berger | Feb. 7, 1956 |
| 3,068,193 | Havens | Dec. 11, 1962 |

FOREIGN PATENTS

| | | |
|---|---|---|
| 885,986 | Great Britain | Jan. 3, 1962 |

OTHER REFERENCES

Wagner: Synthetic Organic Chemistry, pages 233–234 (1953).